United States Patent Office 3,471,503
Patented Oct. 7, 1969

3,471,503
1,2,3,5,6,7-HEXAHYDRO-4-PHENETHYL-2,6-METHANO-4H-4-BENZAZONIN-12-OLS
John R. Carson, Norristown, Pa., assignor to McNeil Laboratories, Incorporated, a corporation of Pennsylvania
No Drawing. Filed May 5, 1967, Ser. No. 636,250
Int. Cl. C07d 29/16, 29/24; A61k 27/00
U.S. Cl. 260—294.7                    2 Claims

ABSTRACT OF THE DISCLOSURE

The compounds are of the class of 1,2,3,5,6,7-hexahydro-benzazonines, useful for their pharmacological properties as hypotensive agents in certain instances and for their ability to produce ataxia in other instances.

---

This invention relates to novel organic compounds and, more particularly, to certain benzazonine derivatives and to the method of preparation.

The subject benzazonines may be structurally represented by the following formulae:

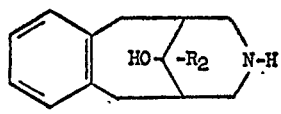

I wherein $R_2$ is a member selected from the group consisting of hydrogen and phenyl; and

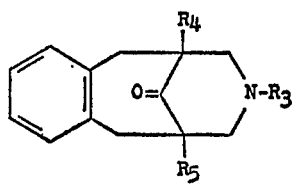

II wherein $R_3$ is a member selected from the group consisting of benzyl, β-phenethyl and methyl and $R_4$ and $R_5$ are members selected from the group consisting of carboxyl and loweralkylcarbonyloxy; and

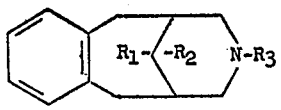

III wherein $R_1$ is a member selected from the group consisting of hydroxyl, loweralkylcarbonylamido and loweralkylcarbonyloxy; $R_1$ and $R_2$ taken together is a member selected from the group consisting of oxo and oximino; $R_3$ is a member selected from the group consisting of benzyl, β-phenethyl and methyl; and the nontoxic acid addition salts and the therapeutically active loweralkyl quaternary ammonium derivatives of compounds represented by Formula III.

The thereapeutically active non-toxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel basic nitrogen containing compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether or tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as quarternizing agents, diethyl ether and benzene are the preferred solvents.

The compounds of Formula III wherein $R_1$ is OH, $R_2$ is methyl or hydrogen and $R_3$ is phenethyl when administered intravenously to anesthetized dogs at doses of 1 to 16 mg./kg. of body weight cause a lowering of blood pressure. The remainder of the compounds tested all cause ataxia when administered intraperitoneally to mice in doses ranging from 30 to 300 mg./kg. of body weight. Ataxia can be used as an indication of central nervous system depression. The acid addition salts of the basic nitrogen containing compounds have the same utility as the basic compounds.

In preparing the compounds of this invention, dimethyl acetone-1,3-dicarboxylate and o-phthalaldehyde are reacted in a solvent such as benzene in the presence of piperidine and glacial acetic acid, with removal of water, for example, by azeotropic distillation to form dimethyl 7-oxo-7H-benzocycloheptene-6,8-dicarboxylate. This compound is reduced, for example, by hydrogenation in the presence of platinum oxide catalyst to form 7-oxo-5,6,8,9-tetrahydro-7H-benzocycloheptene-6,8-dicarboxylate. Reaction of this compound with β-phenethylamine in the presence of formaldehyde yields dimethyl 1,2,3,5,6,7-hexahydro - 12 - oxo - 4 - phenethyl - 2,6 - methano - 4H - 4-benzazonine-2,6-dicarboxylate. Using benzylamine or methylamine in place of β-phenethylamine, the corresponding 4-benzyl and 4-methyl derivatives are obtained. The 2,6-dicarboxylic acid derivatives are prepared by hydrolysis of the dicarboxylic esters, for example, with hydrochloric acid. Hydrolysis and decarboxylation of the 2,6-dicarboxylic esters with phosphoric acid produces the corresponding 4 - substituted-1,2,3,5,6,7-hexahydro-2,6-methano-4H-4-benzazonin-12-ones. The 4-substituted-1,2,3,5,6,7 - hexahydro-12-hydroxyimino-2,6-methano-4H-4-benzazonines may be prepared by reacting the 1,2,3,5,6,7-hexahydro - 4 - substituted-2,6-methano-4H-4-benzazonin-12-one compounds with hydroxylamine hydrochloride in the presence of anhydrous sodium acetate in a suitable solvent such as ethanol. When the 1,2,3,5,6,7-hexahydro-4 - substituted-2,6-methano-4H-4-benzazonin-12-ones are reacted with organolithium reagents such as methyl lithium or phenyl lithium in inert solvents such as ether or benzene, the corresponding 12-substituted-12-alcohols are produced. The 1,2,3,5,6,7-hexahydro-4-substituted-2,6-methano-4H-4-benzazonin-12-ones may be reduced catalytically, for example with platinum in acetic acid, to give 1,2,3,5,6,7-hexahydro-4-substituted-2,6-methano-4H-4-benzazonin-12-ols. These alcohols may be esterified by reaction with a lower aliphatic anhydride in the presence of a base such as the salt of the corresponding aliphatic acid to give the 12-alkanoates. The 12-lower alkyl carbonylamido compounds may be prepared by reducing the 1,2,3,5,6,7 - hexahydro-12-hydroxyimino-4-substituted-2,6-methano-4H-4-benzazonine compounds, for example, with lithium aluminum hydride in a suitable solvent such as tetrahydrofuran, and reacting the resulting product with a lower aliphatic anhydride.

The following examples are intended to illustrate, but not to limit, the scope of the present invention.

EXAMPLE I

The procedure described by Tarbell and Wargotz, J. Amer. Chem. Soc., 76 5761 (1954) for the diethyl ester is followed. A solution of 34.7 grams (0.194 mole) of dimethyl acetone-1,3-dicarboxylate, 26.0 grams (0.194 mole) of o-phthalaldehyde, 2 ml. of piperidine and 8 ml. of glacial acetic acid in 200 ml. of benzene is heated under reflux with azeotropic removal of water until no more water comes off. The mixture is cooled and the precipitated solid is collected by filtration. The filtrate is concentrated in vacuo and the residue is triturated with methanol. Purification is effected by recrystallization from methanol. The product obtained is dimethyl 7-oxo-7H-benzocycloheptene-6,8-dicarboxylate, M.P. 186–188° C.

EXAMPLE II

A suspension of 13.6 grams (0.05 mole) of dimethyl 7-oxo-7H-benzocycloheptene-6,8-dicarboxylate and 0.68 gram of platinum oxide in 100 ml. of glacial acetic acid is hydrogenated on a Parr shaker at 50 p.s.i. Heat is evolved during hydrogenation. The catalyst is removed by filtration, and the solvent is evaporated in vacuo. The residue is dissolved in hot hexane and is allowed to crystallize. The product obtained is dimethyl 7-oxo-5,6,8,9-tetrahydro-7H-benzocycloheptene-6,8-dicarboxylate, M.P. 84–88° C.

EXAMPLE III

A solution of 7.3 grams (0.0264 mole) of crude dimethyl 7-oxo-5,6,8,9-tetrahydro - 7H - benzocycloheptene-6,8-dicarboxylate, 3.96 ml. (0.053 mole) of Formalin and 2.9 ml. (0.0264 mole) of benzylamine in 20 ml. of methanol is heated under reflux for 1 hour. A solid separates on cooling and seeding. The mixture is stirred at room temperature for 18 hours. The solid is collected by filtration and recrystallized from methanol. The product obtained is dimethyl-4-benzyl-1,2,3,5,6,7-hexahydro-12-oxo-2,6 - methano-4H-4-benzazonine-2,6-dicarboxylate, M.P. 142–143° C.

EXAMPLE IV

A 2.7 gram (0.01 mole) sample of dimethyl 6,7,8,9-tetrahydro - 7 - oxo - 5H - benzocycloheptene - 6,8-dicarboxylate, 1.49 cc. (0.02 mole) of 40 percent aqueous formaldehyde solution and 1.21 grams (0.01 mole) of β-phenethylamine in 20 cc. methanol is refluxed 1 hour and is then allowed to stand at room temperature for 20 hours. The reaction mixture is evaporated to an oil which is dissolved in ether and treated with ethereal hydrogen chloride yielding a solid. After several recrystallizations from anhydrous ethanol, the product obtained is dimethyl 1,2,3,5,6,7 - hexahydro-12-oxo-4-phenethyl-2,6-methano-4H-4-benzazonine-2,6-dicarboxylate hydrochloride, M.P. 180–183° C.

EXAMPLE V

A solution of 14.0 grams (0.0344 mole) of methyl 4-benzyl-1,2,3,5,6,7 - hexahydro-12-oxo-2,6-methano-4H-4-benzazonine-2,6-dicarboxylate in 500 ml. of 60 percent phosphoric acid is heated under reflux with stirring for 18 hours. The reaction mixture is cooled, diluted with water and filtered. The filtrate is added with cooling and stirring to a solution containing one kilogram of potassium hydroxide. The resulting mixture is extracted 3 times with ether. The ether solution is washed with brine, dried over magnesium sulfate and concentrated in vacuo. The crystalline material is recrystallized from methylcyclohexane. After recrystallization from 2-propanol followed by recrystallization from ether, the product obtained is 4-benzyl - 1,2,3,5,6,7 - hexahydro - 2,6 - methano - 4H - 4-benzazonin-12-one, M.P. 128–130° C.

EXAMPLE VI

A 5 gram (0.019 mole) sample of dimethyl 1,2,3,5,6,7-hexahydro - 12 - oxo - 4 - phenethyl - 2,6 - methano - 4H-4-benzazonine-2,6-dicarboxylate hydrochloride is dissolved in 50 cc. of 85 percent phosphoric acid, diluted with 50 cc. water and then refluxed for 18 hours. The reaction mixture is cooled and treated with ice water yielding a suspension which is extracted with ether. The aqueous solution is made definitely basic with potassium hydroxide solution and the resulting suspension is extracted with ether. The ethereal solution is dried with magnesium sulfate and evaporated. The oil recovered is chromotographed on an alumina column using 1:1 benzene-petroleum ether to give a colorless eluate which upon evaporation yields an off-white solid. The solid is recrystallized from methylcyclohexane. The product obtained is 4-phenethyl-1,2,3-5,6,7 - hexahydro-2,6-methano-4H-4-benzazonin-12-one, M.P. 99–100° C.

EXAMPLE VII

A 15 gram (0.0328 mole) sample of dimethyl 1,2,3, 5,6,7 - hexahydro-12-oxo-4-phenethyl-2,6-methano-4H-4-benzazonine-2,6-dicarboxylate hydrochloride in 300 cc. of 37 percent hydrochloric acid is heated at steam bath temperature for 6 hours. The reaction mixture is cooled and filtered. The solid recovered is recrystallized from chloroform-methanol. The product obtained is 1,2,3,5,6,7-hexahydro - 12 - oxo - 4 - phenethyl - 2,6 - methano - 4H - 4-benzazonine-2,6-dicarboxylic acid hydrochloride. M.P. 199° C. decn.

EXAMPLE VIII

A mixture of 5 grams (0.0164 mole) 1,2,3,5,6,7,-hexahydro-4-phenethyl - 2,6 - methano-4H - 4 - benzazonin-12-one, 1.17 grams (0.0169 mole) hydroxylamine hydrochloride and 4.1 grams (0.05 mole) anhydrous sodium acetate is refluxed for 3 hours in 120 cc. of 95 percent ethanol. Upon cooling, the reaction mixture is filtered to remove excess sodium acetate. The resulting filtrate is recrystallized from 95 percent ethanol. The product obtained is 1,2,3,5,6,7-hexahydro-12-hydroxyimino-4-phenethyl-2,6-methano-4H-4-benzazonine, M.P. 150–151° C.

EXAMPLE IX

A 22.5 gram (0.046 mole) sample of 4-benzyl-1,2,3,-5,6,7-hexahydro-4-methyl-12-oxo-2,6-methano - 4H - 4-benzazoninium p-toluenesulfonate in 200 ml. of absolute ethanol is hydrogenated at 50 p.s.i. in the presence of one gram of 10% palladium-on-carbon. The catalyst is removed by filtration and the filtrate is evaporated to dryness invacuo. The residual solid is recrystallized from absolute ethanol. The product obtained is 1,2,3,5,6,7-hexahydro-4-methyl-2,6-methano-4H-4-benzazonin-12 - one p-toluenesulfonate, M.P. 192–193° C.

EXAMPLE X

A 15.0 gram (0.0515 mole) sample of 1,2,3,5,6,7-hexahydro - 4 - benzyl-2,6-methano-4H-4-benzazonin-12-one in 13.4 grams (0.072 mole) of methyl p-toluenesulfonate is heated at 80° C. for 18 hours. The mixture is cooled and ground thoroughly with ether. The product obtained is 4-benzyl-1,2,3,5,6,7-hexahydro-4-methyl-12-oxo-2,6-methano-4H-4-benzazoninium p-toluenesulfonate.

EXAMPLE XI

Using the procedure of Example VIII and substituting 4 - benzyl-1,2,3,5,6,7-hexahydro-2,6-methano-4H-4-benzazonin - 12 - one or 1,2,3,5,6,7-hexahydro-4-methyl-2,6-methano-4H-4-benzazonin-12-one for 1,2,3,5,6,7,-hexahydro - 4 - phenethyl-2,6-methano-4H-4-benzazonin-12-one, the products obtained are 4-benzyl-1,2,3,5,6,7-hexahydro-12-hydroxyimino-2,6-methano-4H-4-benzazonine or 1,2,3,5,6,7 - hexahydro - 12 - hydroxyimino-4-methyl-2,6-methano-4H-4-benzazonine respectively.

EXAMPLE XII

A solution of methyl lithium [prepared by treating 0.68 gram (0.0984 mole) of freshly cut lithium wire in 20 cc. ether with 6.95 grams (0.0492) mole) of methyl iodide in 50 cc. ether] is treated with 5 grams (0.0164 mole) of 1,2,3,5,6,7-hexahydro-4-phenethyl-2,6-methano-4H-4-benzazonin-12-one in 80 cc. ether and allowed to stir 18 hours at room temperature. The reaction mixture is filtered to remove excess lithium pieces which are promptly destroyed. The resulting filtrate is cooled and cautiously extracted several times with 3 N hydrochloric acid. The extracts are combined and made definitely basic with 25 percent sodium hydroxide yielding a suspension which is extracted with ether. The ethereal solution is dried with magnesium sulfate and evaporated to an oil. The oily amine is converted to the hydrochloride salt which is recrystallized from ethanol-ether. The product obtained is 1,2,3,5,6,7-hexahydro-12-methyl-4-phenethyl-2,6-methano-4H-4-benzazonin-12-ol, M.P. 195–197° C.

EXAMPLE XIII

Using the procedure of Example XII and substituting 4-benzyl-1,2,3,5,6,7-hexahydro - 2,6 - methano-4H-4-benzazonin - 12 - one or 1,2,3,5,6,7 - hexahydro-4-methyl-2,6-methano-4H-4-benzazonin-12-one for 1,2,3,5,6,7-hexahydro - 4 - phenethyl-2,6-methano-4H-4-benzazonin - 12-one, the products obtained are 4-benzyl-1,2,3,5,6,7-hexahydro - 12 - methyl-2,6-methano-4H-4-benzazonin-12-ol or 4,12-dimethyl-1,2,3,5,6,7-hexahydro-2,6-methano-4H 4-benzazonin-12-ol.

EXAMPLE XIV

To a stirring suspension of 3.48 grams (0.0918 mole) lithium aluminum hydride in 300 cc. dry tetrahydrofuran, a 9.8 gram (0.0306 mole) sample of 1,2,3,5,6,7-hexahydro - 12 - hydroxyimino--4-phenethyl-2,6-methano-4H-4-benzazonine dissolved in 100 cc. tetrahydrofuran is added. The reaction mixture is refluxed 6½ hours and then stirred at room temperature for 16½ hours. Cautiously 10 cc. of water and 3 cc. of 25 percent sodium hydroxide are added and the resulting mixture after addition of ether is stirred at room temperature for one hour. The reaction mixture is filtered to give the filtrate which is evaporated to an oil. The oil is dissolved in ether, dried with magnesium sulfate and evaporated. The oily amine obtained is dissolved in ether and treated with 5 grams (0.0384 mole) of propionic anhydride. The reaction mixture is warmed on a steam bath for ½ hour, cooled and filtered. The precipitate is recrystallized from aqueous ethanol. The product obtained is 1,2,3,5,6,7-hexahydro - 12 - propionamido-4-phenethyl-2,6-methano-4H-4-benzazonine, M.P. 150–151° C.

EXAMPLE XV

To 1.43 grams (0.206 mole) of freshly cut lithium wire in 10 cc. ether, 16.2 grams (0.103 mole) of bromobenzene in 25 cc. ether is added at a rate so as to control refluxing. Upon complete addition the suspension is allowed to stir at room temperature one hour and then the mixture is treated with 50 cc. benzene. The ether in the reaction mixture is removed by distillation. To the resulting reaction mixture, 10 grams (0.0344 mole) of 1,2,3,5,6,7 - hexahydro-4-benzyl-2,6-methano-4H-4-benzazonin-12-one in 20 cc. benzene is added and allowed to reflux 1¼ hours and then allowed to stand at room temperature for 18 hours. After the large unused pieces of lithium are removed and destroyed, the reaction is treated with a saturated ammonium chloride solution. Chloroform is added and the resulting mixture is stirred at room temperature for ½ hour. The layers are separated and the aqueous layer is extracted several times with chloroform. The organic layer is combined with the chloroform extracts, dried with magnesium sulfate and evaporated to an oil which crystallizes upon cooling. The solid is recrystallized from methylcyclohexane. The product obtained is 4-benzyl-1,2,3,5,6,7-hexahydro-12-phenyl-2,6-methano-4H-4-benzazonin-12-ol, M.P. 150–151° C.

EXAMPLE XVI

Using the procedure of Example XV and substituting 1,2,3,5,6,7-hexahydro-4-phenethyl - 2,6 - methano-4H-4-benzazonin-12-one or 1,2,3,5,6,7-hexahydro-4-methyl-2,6-methano-4H-4-benzazonin-12-one for 4-benzyl-1,2,3,5,6,7-hexahydro - 2,6 - methano-4H-4-benzazonin-12-one the products obtained are 1,2,3,5,6,7-hexahydro-4-phenethyl-12-phenyl-2,6-methano-4H-4-benzazonin-12-ol or 1,2,3,5,6,7-hexahydro-4-methyl-12-phenyl-2,6-methano - 4H - 4-benzazonin-12-ol respectively.

EXAMPLE XVII

A 10 gram (0.0271 mole) sample of 4-benzyl-1,2,3,5,6,7-hexahydro - 12 - phenyl-2,6-methano - 4H-4-benzazonin-12-ol in 200 cc. glacial acetic acid containing 6 drops perchloric acid is hydrogenated at room temperature using 0.5 gram of 10 percent palladium-on-carbon as the catalyst. The catalyst is removed by filtration and the resulting filtrate is cautiously evaporated under reduced pressure to an oil. The oil is treated with ice and sodium bicarbonate giving a solid which is dissolved in chloroform. The chloroform solution is dried with magnesium sulfate and evaporated to an amorphous solid. The solid is recrystallized from anhydrous ethanol. The product obtained is 1,2,3,5,6,7-hexahydro-12-phenyl-2,6-methano-4H-4-benzazonin-12-ol, M.P. 227–228° C.

EXAMPLE XVIII

Using the procedure of Example XVII and substituting 4-benzyl - 1,2,3,5,6,7-hexahydro-2,6-methano-4H-4-benzazonin-12-one for 4-benzyl-1,2,3,5,6,7-hexahydro-12-phenyl-2,6-methano-4H-4-benzazonin-12-ol, the product obtained is 1,2,3,5,6,7-hexahydro-2,6-methano-4H-4-benzazonin-12-ol.

EXAMPLE XIX

A 2 gram (0.00655 mole) sample of 1,2,3,5,6,7-hexahydro-4-phenethyl-2,6-methano-4H-4-benzazonin-12-one in 75 cc. glacial acetic acid is hydrogenated at room temperature using 0.17 gram of platinum oxide as the catalyst. After removal of the catalyst by filtration, the resulting solution is evaporated under reduced pressure to an oil. The oil is dissolved in water and the aqueous solution is made definitely basic with 25 percent sodium hydroxide, giving an oily suspension. The suspension is extracted with ether and the ethereal extract is dried with magnesium sulfate and evaporated to an oil. The oil is dissolved in ether and treated with ethereal hydrogen chloride. On recrystallization from anhydrous ethanol-ether the product obtained is 1,2,3,5,6,7 - hexahydro-4-phenethyl-2,6-methano-4H-4-benzazonin-12-ol hydrochloride (⅓ mole water), M.P. 186.5–188.5° C.

EXAMPLE XX

Using the procedure of Example XIX and substituting 1,2,3,5,6,7 - hexahydro-4-methyl-2,6-methano-4H-4 - benzazonin-12-one for 1,2,3,5,6,7-hexahydro-4-phenethyl-2,6-methano-4H-4-benzazonin-12-one, the product obtained is 1,2,3,5,6,7-hexahydro-4-methyl-2,6-methano-4H-4-benzazonin-12-ol.

EXAMPLE XXI

A 7 gram (0.023 mole) sample of 1,2,3,5,6,7-hexahydro-4-phenethyl-2,6-methano-4H-4-benzazonin-12-one in 120 cc. glacial acetic acid is hydrogenated at room temperature using 0.6 gram of platinum oxide as the catalyst until the theoretical quantity of hydrogen is taken up. The catalyst is removed by filtration and the resulting solution is evaporated to an oil. The oil is treated with cold 25 percent sodium hydroxide solution causing crystallization to occur. A 6.7 gram (0.0219 mole) sample of the resulting alcohol mixed with 6.32 grams (0.0657 mole) of sodium propionate and 14.3 grams (0.109 mole) propionic anhydride is heated on a steam bath 2 hours and then poured into ice water. After standing for ½ hour the aqueous mixture is made neutral with sodium bicarbonate and allowed to stir for ½ hour at room temperature yielding an oil which slowly crystallizes to a solid. The solid is dissolved in methanol at 37° C. and the resulting solution is cooled on Dry Ice. The crystals recovered are dissolved in ether and a solution of perchloric acid in ethanol is added. The precipitate that forms is collected and recrystallized from an anhydrous ethanol. The product obtained is (1,2,3,5,6,7-hexahydro-4-phenethyl-2,6-methano - 4H - 4 - benzazonin - 12-yl)propionate perchloride, M.P. 200–202° C.

EXAMPLE XXII

A solution of 11.2 grams (0.0369 mole) of diethyl 7 - oxo - 5,6,8,9-tetrahydro-7H-benzocycloheptene-6,8-dicarboxylate, 5.54 ml. of Formalin (0.0738 mole) and 3.81 ml. (0.0369 mole) of 30 percent methylamine solution in 30 ml. of ethanol is stirred at room temperature for 18 hours. Crystals separate from the mixture and are collected by filtration and recrystallized from ethanol. The product is diethyl 4-methyl-1,2,3,5,6,7-hexahydro-12-oxo-2,6-methano-4H-4-benzazonine - 2,6 - dicarboxylate, M.P. 113–114° C.

What is claimed is:
1. 1,2,3,5,6,7-hexahydro - 12 - methyl - 4 - phenethyl-2,6-methano-4H-4-benzazonin-12-ol.
2. 1,2,3,5,6,7-hexahydro - 4 - phenethyl - 2,6-methano-4H-benzazonin-12-ol hydrochloride.

References Cited

Cremical Abstracts, vol. 65, August 1966, pp. 3829–30, Hahn et al.

HENRY R. JILES, Primary Examiner

S. D. WINTERS, Assistant Examiner

U.S. Cl. X.R.

260—293.4, 294, 294.3, 999